United States Patent
Filion et al.

Patent Number: 5,423,488
Date of Patent: Jun. 13, 1995

[54] SPRAY APPARATUS FOR MIXING, ATOMIZING AND SPRAYING FOAM FORMING COMPONENTS

[75] Inventors: Scott M. Filion, Newmarket; John H. Carberry, Brookfield, both of N.H.

[73] Assignee: Davidson Textron Inc., Dover, N.H.

[21] Appl. No.: 241,449

[22] Filed: May 11, 1994

[51] Int. Cl.6 .............................................. B05B 1/34
[52] U.S. Cl. .................................... 239/488; 239/493
[58] Field of Search ............... 239/487, 491, 493, 399, 239/402, 463, 466, 488, 492, 494, 496, 432; 366/336, 338, 339

[56] References Cited

U.S. PATENT DOCUMENTS

| | | | |
|---|---|---|---|
| 1,941,898 | 1/1934 | Iddings | 239/487 X |
| 2,034,867 | 3/1936 | Hayes | 239/487 X |
| 2,050,368 | 8/1936 | Neely | 239/487 X |
| 2,055,864 | 9/1936 | Harsch | 239/493 X |
| 2,847,196 | 8/1958 | Franklin et al. | 259/8 |
| 3,306,540 | 2/1967 | Reichert | 239/432 X |
| 3,361,412 | 1/1968 | Cole, III | 239/432 X |
| 3,692,245 | 9/1972 | Needham et al. | 239/488 |
| 3,795,364 | 3/1974 | Kattner | 239/432 X |
| 3,841,565 | 10/1974 | Buisson et al. | 239/488 |
| 3,850,371 | 11/1975 | Trapp | 259/113 |
| 3,923,288 | 12/1975 | King | 239/488 X |
| 3,949,970 | 4/1976 | ter Braak | 239/488 X |
| 4,133,485 | 1/1979 | Bouvin | 239/488 X |
| 4,213,936 | 7/1980 | Lodrick | 239/432 X |
| 4,440,320 | 4/1984 | Wernicke | 222/145 |
| 4,473,531 | 9/1984 | Macosko et al. | 422/133 |
| 4,986,667 | 1/1991 | Berger | 366/173 |
| 5,086,949 | 2/1992 | Vulpitta et al. | 222/1 |

FOREIGN PATENT DOCUMENTS

| | | | |
|---|---|---|---|
| 635208 | 1/1962 | Canada | 239/487 |
| 819319 | 10/1937 | France | 239/487 |
| 2356229 | 5/1975 | Germany | 239/487 |
| 265402 | 2/1927 | United Kingdom | 239/399 |
| 611313 | 10/1948 | United Kingdom | 239/487 |

*Primary Examiner*—Andres Kashnikow
*Assistant Examiner*—Lesley D. Morris
*Attorney, Agent, or Firm*—Reising, Ethington, Barnard & Perry

[57] ABSTRACT

Spray apparatus for mixing, atomizing and spraying foam forming components has a hollow wand of extensive length that is adapted to be connected at one end to a conventional mixhead and has mounted therein a static mixing element that extends the length of the wand. A nozzle having a singular central orifice through its tip is mounted on the distal end of the wand and houses a floating core. The core has a convex end facing the orifice and is contactible thereabout with an interior side of the nozzle tip. The mixing element has a spiral shape that operates to incite turbulence and thereby enhance mixing of the foam forming components passing through the wand from the mixhead. The core has a peripheral surface that converges in the direction of the orifice and angled channels in this surface separate the mixed components into streams directed toward the orifice and together with the orifice atomize the mixed components and cause the discharge thereof in a uniform atomized cone-shaped spray pattern.

4 Claims, 2 Drawing Sheets

SPRAY APPARATUS FOR MIXING, ATOMIZING AND SPRAYING FOAM FORMING COMPONENTS

TECHNICAL FIELD

This invention relates to apparatus for spraying foam forming materials and more particularly to the mixing, atomizing and spraying mechanisms thereof.

BACKGROUND OF THE INVENTION

Historically, poor foam formation in the construction of automotive interior trim components such as instrument pads, door panels, arm rests, glove boxes, center consoles and close out panels has been the foremost cause of scrap and repair related problems in production. These components typically comprise a thermoplastic shell or cover, a metal or plastic retainer and urethane foam to fill the space between the shell and retainer. Urethane foam defects of underfills, voids, ratty foam cell structure, and uneven mix of its components (isocyanate and polyol) is a major manufacturing problem plaguing the entire industry that produces automotive interior trim components of such composite construction. In addition to the manufacturing defects, poor urethane foam formation can cause field failures of the assembled products such as color changes and staining, rough and irregular cover surfaces and cover sinks.

Currently, interior panels such as the instrument panel are typically manufactured using a process called open pouring. In this process, the two halves of a tool called the cavity and lid are opened and foam is poured directly out of a mixhead at low or high pressure onto the backside of the instrument panel shell in general areas. The tool halves are then closed to sandwich the foam between the shell and a retainer with the foam then traveling via blowing agents to fill the open areas. However, a new and improved method has been developed wherein the foam is sprayed onto the entire backside of the shell. This new method is disclosed in U.S. application Ser. No. 08/108,236 filed Aug. 19, 1993, now U.S. Pat. No. 5,389,317, entitled METHOD FOR CONSTRUCTING MOLDED COMPOSITE ARTICLES COMPRISING A SHAPED FOAM CUSHION and assigned to the assignee of this invention. In this method, it is important that the foam be very thoroughly mixed and sprayed onto the shell in a uniform pattern to take full advantage of the improvements available from using this method.

It has been found that conventional mixheads and nozzles are not suited to the task in that the foam components need to be thoroughly mixed and atomized and delivered through a nozzle of extensive length, e.g. as much as about 7 inches, to attain the desired reaching distance so that the tip is approximately 8–12 inches from all the different size mold cavities typically used on a production line. Moreover, the nozzle must then at its tip very evenly or uniformly spray the foam onto the shell. Furthermore, it is important that such a long nozzle be thoroughly flushed with solvent to prevent material buildup both in the nozzle and at its spray tip.

SUMMARY OF THE INVENTION

The present invention meets the above requirements with a relatively simple apparatus comprising a hollow wand of extensive length that is adapted to be connected at one end to a conventional liquid foam forming components mixhead and has mounted therein a static mixing element that extends the length of the wand. A spray tip is mounted on the distal end of the wand and houses a floating core. The core has a convex end facing the orifice and is contactible thereabout with the tip. The mixing element has a spiral shape that operates to incite extremely turbulent flow and thereby significantly enhance mixing of the foam forming components issuing from the mixhead as they pass through the wand. The core has a peripheral surface that converges in the direction of the orifice and a plurality of angled channels in this surface act on the thoroughly mixed forming components to send it in spiral streams to the orifice with the combined action of the channels and orifice atomizing the liquid mixture and discharging it out the orifice in a uniform atomized cone-shaped spray. Then when solvent is delivered from the mixhead to clean and flush the apparatus, the spiral mixing element incites extremely turbulent flow of the solvent to enhance scrubbing and thus the solvent's cleaning ability.

It is therefore an object of the present invention to provide new and improved apparatus for thoroughly mixing and spraying foam forming components in a uniform pattern.

Another object is to provide spray apparatus adapted to be connected to a conventional foam forming components mixhead for enhancing mixing of the foam forming components issuing from the mixhead and spraying same in a uniform atomized cone-shaped pattern.

Another object is to provide spraying apparatus adapted to be connected to a conventional mixhead and operable with a hollow wand of extensive length to incite extremely turbulent flow of foam producing components issuing from the mixhead for enhanced mixing and then break the turbulent flow into angled streams and recombine same to deliver a uniform atomized cone-shaped spray pattern.

Another object is to provide a compact, low cost, highly efficient spray apparatus for thoroughly mixing foam forming components issuing from a mixhead and then spraying same in a uniform atomized cone-shaped pattern.

BRIEF DESCRIPTION OF THE DRAWING

These and other objects, advantages and features of the invention will become more apparent from the following description of the preferred embodiment with reference to the accompanying drawing wherein.

DETAILED DESCRIPTION OF THE PREFERRED EMBODIMENT

Figure 1:
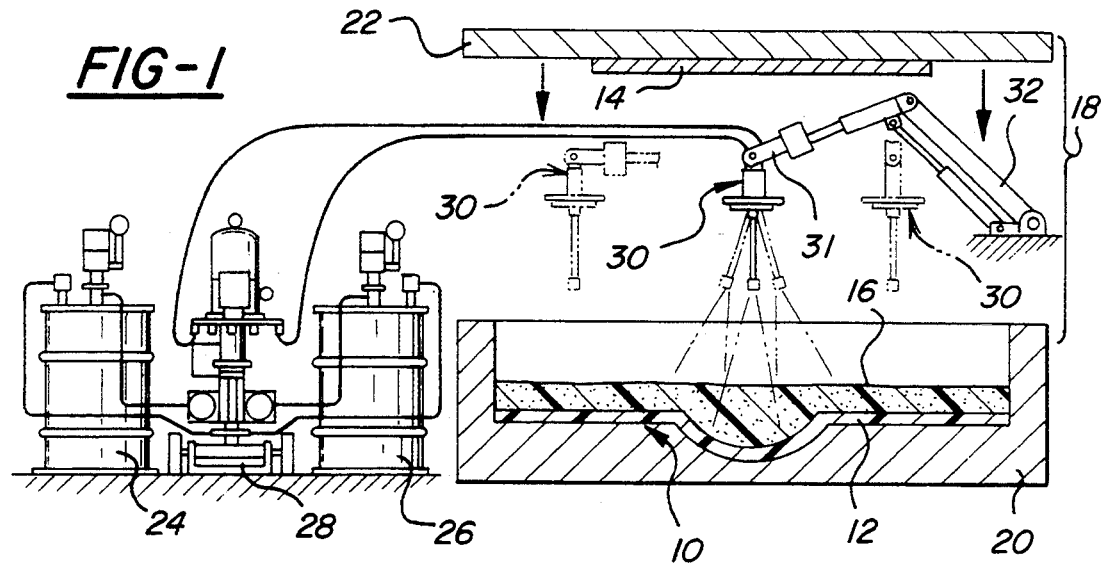
FIG. 1 is an elevational view showing the apparatus of the present invention in use in spraying an automotive interior trim panel and wherein the panel and the tooling therefor are shown in cross-section.

Referring to FIG. 1 of the drawing, there is illustrated a typical article in the form of an automotive interior trim component 10 being sprayed with foam forming material using the spray apparatus of the present invention. The trim component comprises an outer shell 12, a retainer 14 and a foam cushion 16 to be formed therebetween in a tool 18. The tool comprises a lower half 20 with a cavity that receives the preformed shell and an upper half or lid 22 on which the preformed retainer is mounted on the underside thereof.

The shell can be made of any thermoplastic material that is aesthetically attractive and pleasant to the touch. Typically, the shell has a uniform wall thickness and is made of polyvinyl chloride (PVC). Other possibilities are thermoplastic urethanes (TPU), thermoplastic polyolefins (TPO)/thermoplastic elastomers (TPE) and polyesters.

The retainer 14 can be made of any suitable structural material that is of sufficient strength for handling and fastening the component to support structure such as an automobile body or door. The material must also be compatible with that of the shell and foam. Typical examples are steel, aluminum and structural plastics such as polycarbonate, acrylonitrile-butadiene-styrene (ABS) and styrene-maleic anhydride and their associate copolymer blends.

The primary function of the foam is to fill the space between the shell and give it a soft feel. The aforementioned U.S. Pat. No. 5,389,317 which is hereby incorporated by reference discloses an improved method for molding such a composite article wherein the form forming materials are sprayed onto the backside of the shell with a spraying system developed for spray coating roof and wall insulation. While this has proven generally satisfactory, the present invention is a significant improvement thereover in the mixing, atomizing and uniform spray functions.

As illustrated in FIG. 1, the spray system for implementing the method disclosed in the aforementioned U.S. Pat. No. 5,389,317 comprises sources 24 and 26 of the foam forming components polyol and isocyanate in liquid form supplying a proportioning pump 28. The pump delivers these liquid components in the proper ratio to a mixhead 30 mounted on the arm 31 of a conventional robot 32. The robot 32 is programmed to locate and control the movement of the mixhead at a prescribed angle and uniform distance relative to the surface of the shell 12 and to automatically trigger the mixhead to dispense the foam forming material at the proper time. The conventional mixhead 30 properly mixes the two liquid foam forming components but lacks in flushing performance. This problem is cured as well as a uniform atomized spray pattern being provided by the addition of a straight thin wall hollow wand 34 that is adapted to be connected at one end to the mixhead 30 by a lock nut 36. The nut internally engages a raised annular collar 38 formed on this end of the wand and threads to a hollow female fitting 40 that is fixed to a mounting plate 42. The plate 42 together with an intermediate mounting plate 44 is bolted to the delivery side of the mixhead. The hollow female fitting aligns with the mixhead's discharge port 46 to thus communicate the partially mixed liquid components from the mixhead with the interior of the wand. The wand has an extensive length of about 7 inches to conveniently reach to the various size molds commonly used but can be shorter where such long reach is not needed.

A static spiral mixing element 48 is mounted in the wand and extends substantially the length thereof. The element has a thin cross-section so as to not significantly impede flow while causing the mixed liquid components issuing from the mixhead to take a spiral path that incites extremely turbulent action to enhance mixing of the materials as well as improving flush as they flow through the length of the wand.

Figure 3:
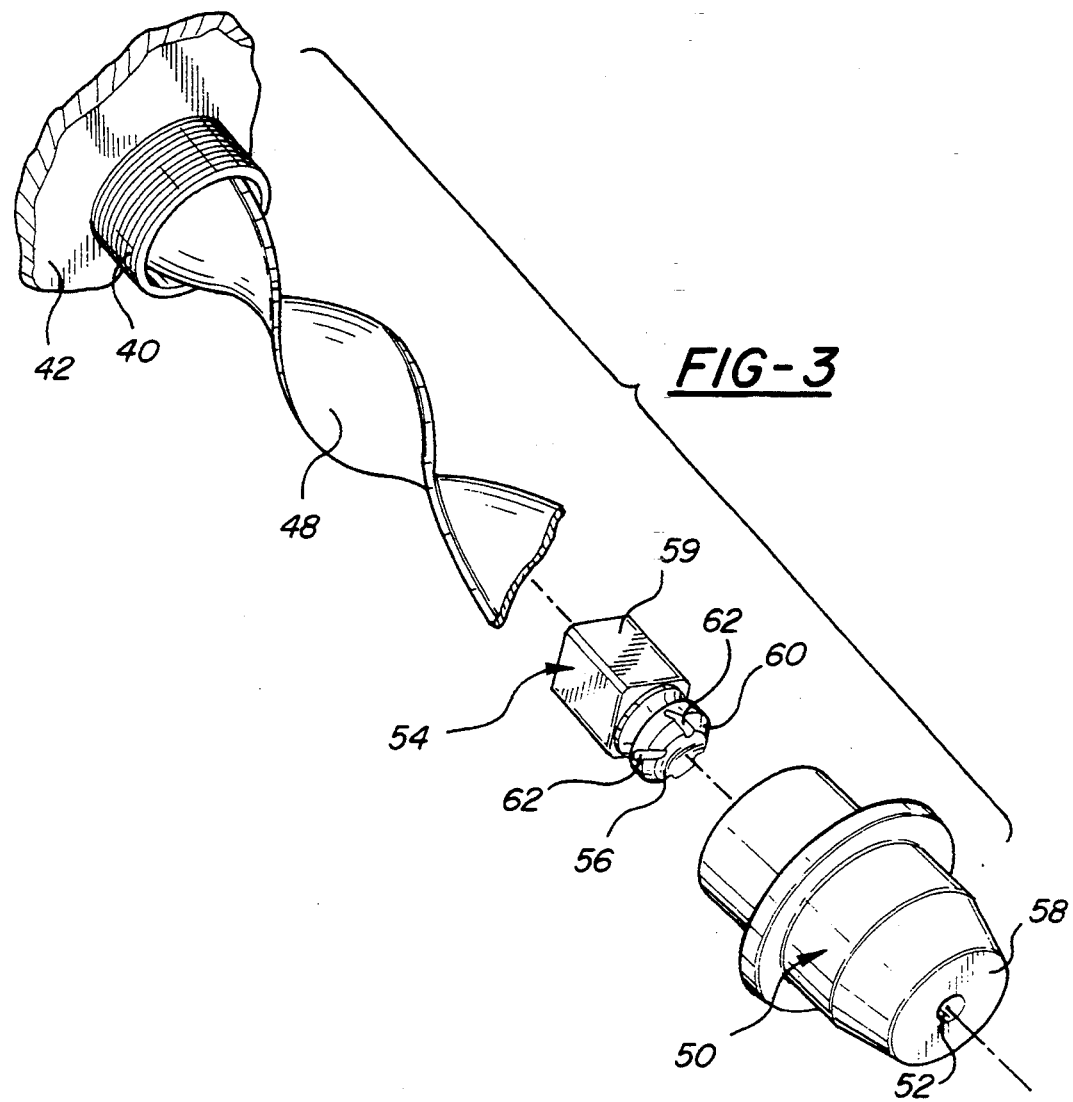
FIG. 3 is an enlarged perspective view of the core in FIG. 2.
Figure 2:
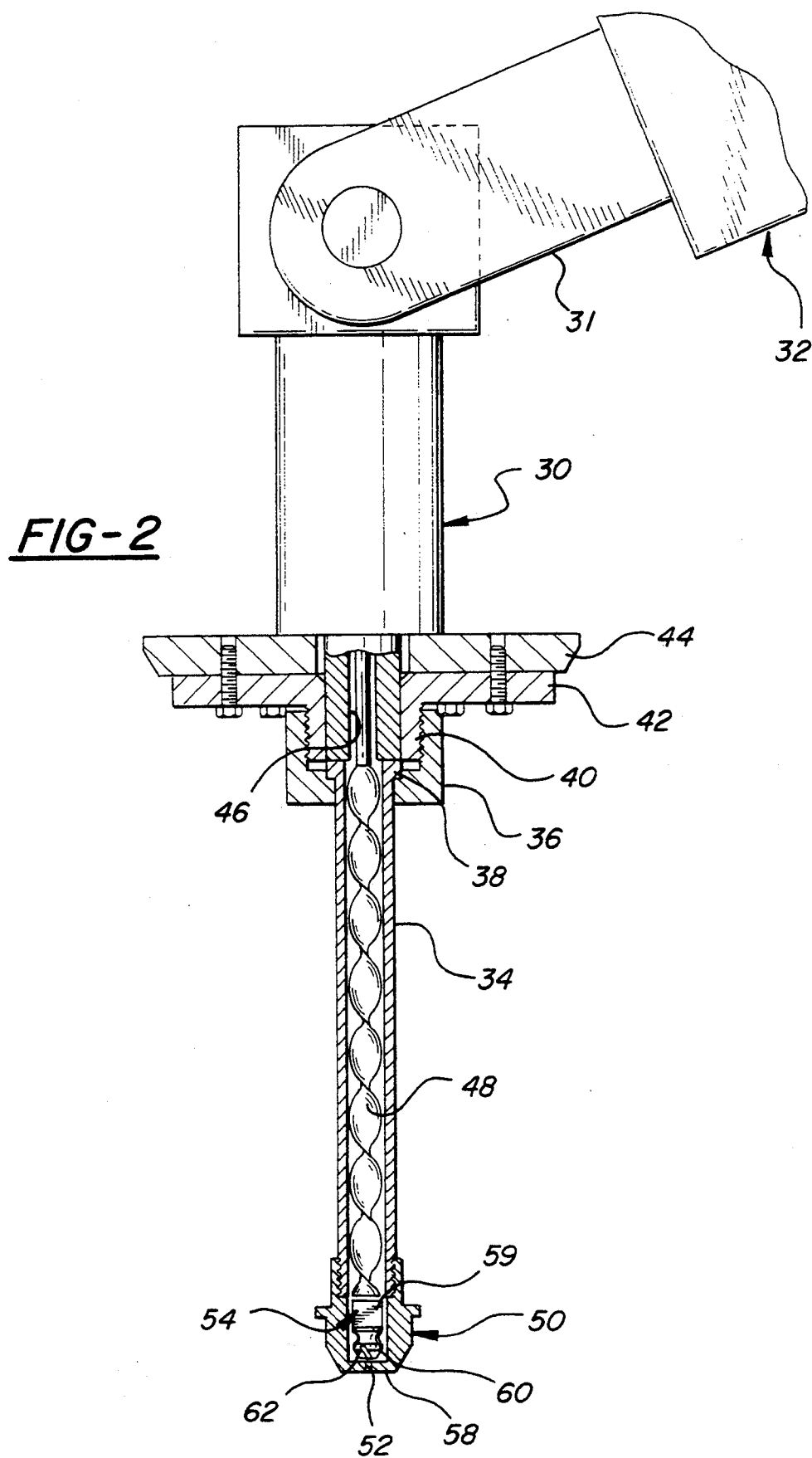
FIG. 2 is a longitudinal sectional view of the mixhead and the apparatus of the present invention in FIG. 1.

An internally threaded nozzle 50 having a singular central orifice 52 is screwed to external threads on the distal end of the wand and houses a completely axial floating core 54 shown in FIGS. 2 and 3. The core has a convex shaped end 56 that faces the orifice and is contactible thereabout with the interior side of the nozzle tip 58 through which the orifice extends. The core has a flat sided section 59 to permit flow therepast to a frustoconical peripheral surface 60 formed on the core that converges in the direction of the orifice. A plurality of parallel channels 62 of uniform cross-section are formed in the surface 60 at an angle to the core centerline and extend through or intersect with the edge of the convex end 56 to communicate the interior of the wand with the orifice.

The turbulent flow of mixed liquid components exiting the static mixing element 48 is broken up by the core and divided into parallel spiral streams by the core channels 62 which are at an angle to the centerline of the wand. These spiral streams are then caused to join in the convex end 56 of the core and exit out the orifice. The multiple channels 62, the convex end 56 and single orifice 52 combine to atomize the fluid material and deliver it from the spray tip in a uniform cone-shape spray pattern onto the backside of the shell 12. The size of the pattern is based on the flow rate and material viscosity which thus can be varied accordingly.

Following periodic use of the spray apparatus in applying the foam forming components, a solvent such as methylene chloride may be introduced to clean and flush the spray gun. The turbulent and spiral action caused by the mixing element and core channels are then effective to enhance the cleaning by the solvent by causing strong scrubbing action on the internal surfaces.

The wand, nozzle and core are preferably made of stainless steel and the orifice in the nozzle may be in the form of an insert that is press fit in the tip. The static mixing element is preferably made of plastic.

The invention has been described in an illustrative manner, and it is to be understood that the terminology that has been used is intended to be in the nature of words of description rather than of limitation. Obviously, many modifications and variations of the present invention in light of the above teachings may be made. It is therefore to be understood that within the scope of the appended claims, the invention may be practiced otherwise than as specifically described.

What is claimed is:

1. Spraying apparatus for mixing, atomizing and spraying liquid foam forming components in a uniform pattern comprising a liquid foam forming components mixhead, a hollow wand of extensive length connected at one end to said liquid foam forming components mixhead, a static mixing element mounted in said wand, a nozzle having a tip with an orifice extending therethrough, said nozzle mounted on a distal end of said wand and housing a completely free floating core, said core having a convex end facing the orifice and contacting thereabout with an interior side of said tip during a spraying operation with said mixhead, said mixing element having a shape that operates to incite extremely turbulent flow of liquid foam forming components issuing from said mixhead as the components pass through said wand to thereby cause thorough mixing of the components, said core having a peripheral surface that converges in the direction of said orifice, a plurality of channels in said surface, said core having a flat sided section providing for flow therepast in said nozzle from said distal end of said wand to said channels, said channels operable to act on the mixture of liquid foam forming components issuing from said mixing element and flowing past said flat sided section to separate the mixture into spiral streams directed to said convex end and said orifice wherein the combined action of said channels, convex end and orifice atomize the liquid mixture and discharge it out the orifice in a uniform atomized cone-shaped spray pattern.

2. Spraying apparatus for mixing, atomizing and spraying liquid foam forming components in a uniform pattern comprising a liquid foam forming components mixhead, a hollow wand of extensive length connected at one end to said liquid foam forming components mixhead, a static mixing element mounted in and extending substantially the length of said wand, a nozzle having a tip with a singular orifice extending therethrough, said nozzle mounted on a distal end of said wand and housing a completely free floating core, said core having a convex end facing the orifice and contacting thereabout with an interior side of said tip during a spraying operation with said mixhead, said mixing element having a shape that operates to incite extremely turbulent flow of liquid foam forming components issuing from said mixhead as the components pass through said wand to thereby cause thorough mixing of the components, said core having a peripheral surface that converges in the direction of said orifice, a plurality of angled channels in said surface, said core having a flat sided section providing for flow therepast in said nozzle from said distal end of said wand to said channels, channels operable to act on the mixture of liquid foam forming components issuing from said mixing element and flowing past said flat sided section to separate the mixture into spiral streams directed to said convex end and said orifice wherein the combined action of said channels, convex end and orifice atomize the liquid mixture and discharge it out the orifice in a uniform atomized cone-shaped spray pattern.

3. Spraying apparatus for mixing, atomizing and spraying liquid foam forming components in a uniform pattern comprising a liquid foam forming components mixhead, a straight hollow wand of extensive length connected at one end to said liquid foam forming components mixhead, a static mixing element mounted in and extending substantially the length of said wand, a nozzle having a tip with a singular central orifice extending therethrough, said nozzle mounted on a distal end of said wand and housing a completely free floating core, said core having a convex end facing said orifice and contacting thereabout with an interior side of said tip during a spraying operation with said mixhead, said mixing element having a spiral shape that operates to incite extremely turbulent flow of liquid foam forming components issuing from said mixhead as the components pass through said wand to thereby cause thorough mixing of the components, said core having a peripheral frustoconical surface that converges in the direction of said orifice, a plurality of parallel channels in said surface angled to a centerline of said core and intersecting with said convex end, said core having a flat sided section providing for flow therepast in said nozzle from said distal end of said wand to said channels, said channels operable to act on the mixture of liquid foam forming components issuing from said mixing element and flowing past said flat sided section to separate the mixture into spiral streams directed to said convex end and said orifice wherein the combined action of said channels, convex end and orifice atomize the liquid mixture and discharge it out the orifice in a uniform atomized cone-shaped spray pattern.

4. Spraying apparatus for mixing, atomizing and spray foam forming components in a uniform pattern comprising a liquid foam forming components mixhead, a straight hollow wand of extensive length connected at one end to said liquid foam forming components mixhead, a static spiral shaped mixing element mounted in and extending substantially the length of said wand, a nozzle having a tip with a singular orifice extending therethrough, said nozzle mounted on a distal end of said wand and housing a completely free floating core, said core having a convex end facing the orifice and contacting thereabout with an interior side of said tip during a spraying operation with said mixhead, said mixing element having a spiral shape that operates to incite extremely turbulent flow of liquid foam forming components issuing from said mixhead as the components pass through said wand to thereby cause thorough mixing of the components, said core having a peripheral surface that converges in the direction of said orifice, a plurality of parallel channels of uniform cross-section in said surface intersecting with said convex end, said core having a flat sided section providing for flow therepast in said nozzle from said distal end of said wand to said channels, said channels being angled to a centerline of the core so as to act on the mixture of foam forming components issuing from said mixing element and flowing past said flat sided section to separate the mixture into spiral streams to said convex end and said orifice wherein the combined action of said channels, convex end and orifice atomize the liquid mixture and discharge it out the orifice in a uniform atomized cone-shaped spray pattern.

* * * * *